US009913483B2

(12) United States Patent
Vuholm et al.

(10) Patent No.: US 9,913,483 B2
(45) Date of Patent: Mar. 13, 2018

(54) METHOD AND A DEVICE FOR AUTOMATICALLY CUTTING MEAT PRODUCTS SUCH AS BEEF TENDERLOIN INTO PORTIONS

(71) Applicant: Marel A/S, Aarhus N (DK)

(72) Inventors: Jesper Ågård Vuholm, Hadsten (DK); Henrik Thrysoe, Frisco, TX (US); Johan Enevoldsen, Solbjerg (DK)

(73) Assignee: Marel A/S, Aarhus (DK)

( * ) Notice: Subject to any disclaimer, the term of this patent is extended or adjusted under 35 U.S.C. 154(b) by 0 days.

(21) Appl. No.: 15/313,351

(22) PCT Filed: Sep. 23, 2015

(86) PCT No.: PCT/DK2015/050292
§ 371 (c)(1),
(2) Date: Nov. 22, 2016

(87) PCT Pub. No.: WO2016/045683
PCT Pub. Date: Mar. 31, 2016

(65) Prior Publication Data
US 2017/0196232 A1 Jul. 13, 2017

(30) Foreign Application Priority Data

Sep. 23, 2014 (DK) .................................. 2014 00544
Jan. 22, 2015 (EP) .................................... 15152099

(51) Int. Cl.
*G06K 9/00* (2006.01)
*A22C 17/00* (2006.01)
(Continued)

(52) U.S. Cl.
CPC .......... *A22C 17/0086* (2013.01); *G06T 7/001* (2013.01); *G06T 7/13* (2017.01); *G06T 2207/30128* (2013.01)

(58) Field of Classification Search
CPC ...... B26D 7/30; B26D 5/007; B26D 2210/02; G06T 2207/30128; A22C 17/0006
See application file for complete search history.

(56) References Cited

U.S. PATENT DOCUMENTS 4,557,019 A * 12/1985 Van Devanter ........ A22C 25/18
452/157
4,962,568 A * 10/1990 Rudy ................... A22C 17/002
452/157
(Continued)

FOREIGN PATENT DOCUMENTS

EP        2636495 A1    9/2013
WO    2007022781 A3    3/2007

OTHER PUBLICATIONS

"Cutting Meat to Order for the Supermarkets"; Design Engineering; Morgan-Grampian Ltd.; London, GB; Nov. 1, 1999; p. 58.
(Continued)

*Primary Examiner* — Wesley Tucker
(74) *Attorney, Agent, or Firm* — Justin Cassell; Workman Nydegger

(57) ABSTRACT

This invention relates to method of automatically cutting a meat product, in particular beef tenderloin, having a thumb-like part extending away from a head part of the meat product towards a tail part such that the meat product has a V-shape. The method includes conveying a meat product to be cut, obtaining image data of the meat product, determining a boundary position between a thumb-like part and a head part of the meat product, and utilizing the image data in instructing a cutting unit to cut the meat product into portions, where the cutting includes cutting on both sides of the boundary position such that the resulting portion fulfills a pre-defined criteria including a criteria indicating the extent of the thumb-like part in the resulting portion.

9 Claims, 3 Drawing Sheets

(51) Int. Cl.
*G06T 7/00* (2017.01)
*G06T 7/13* (2017.01)

(56) References Cited

U.S. PATENT DOCUMENTS

| | | | | |
|---|---|---|---|---|
| 5,163,865 A * | 11/1992 | Smith | ............... | A22C 17/0086 452/157 |
| 5,184,733 A * | 2/1993 | Arnarson | ............... | A22C 25/00 177/1 |
| 5,937,080 A * | 8/1999 | Vogeley, Jr. | ........... | A22B 5/007 382/110 |
| 6,164,174 A * | 12/2000 | Sigurdsson | ....................... | 83/13 |
| 6,604,991 B1 * | 8/2003 | Jurs | ........................ | B26D 5/00 452/150 |
| 6,882,434 B1 * | 4/2005 | Sandberg | ........... | A22C 17/0033 250/223 R |
| 7,251,537 B1 * | 7/2007 | Blaine | ................ | A22C 17/0086 452/156 |
| 7,285,040 B2 * | 10/2007 | Ilch | ..................... | A22B 5/0029 452/150 |
| 7,452,266 B2 * | 11/2008 | Bottemiller | .............. | A22C 7/00 452/150 |
| 7,593,785 B2 * | 9/2009 | Blaine | ................ | A22C 17/0086 700/103 |
| 7,715,935 B2 * | 5/2010 | Vogeley, Jr. | ............. | A22C 7/00 100/137 |
| 7,806,029 B2 * | 10/2010 | Rozot | ................ | B22D 11/1265 148/194 |
| 7,809,522 B2 * | 10/2010 | Wargon | .................... | B26D 7/30 702/156 |
| 7,841,264 B2 * | 11/2010 | Kim | ........................ | B26D 3/10 452/156 |
| 8,096,860 B2 * | 1/2012 | Bolte | .................. | A22C 17/002 452/157 |
| 8,643,851 B2 * | 2/2014 | Weber | ................ | A22C 17/0033 356/601 |
| 8,758,099 B2 * | 6/2014 | Reifenhaeuser | ..... | A22C 17/002 452/157 |
| 9,008,824 B1 * | 4/2015 | Blaine | ..................... | B26D 5/00 700/103 |
| 9,091,673 B2 * | 7/2015 | Fern | ..................... | A22B 5/0041 |
| 9,285,213 B2 * | 3/2016 | Lindee | ............... | A22C 17/0033 |
| 9,538,768 B2 * | 1/2017 | Dunivan | ............ | A22C 17/0086 |
| 9,675,091 B1 * | 6/2017 | Eger | ................... | A22C 17/0086 |
| 2005/0032471 A1 | 2/2005 | Pfarr et al. | | |
| 2008/0281461 A1 | 11/2008 | Blaine et al. | | |
| 2016/0106113 A1 * | 4/2016 | Anderson | ........... | A22B 5/0058 452/148 |

OTHER PUBLICATIONS

PCT International Search Report; International Application No. PCT/DK2015/050292; Date of Actual Complation of International Search: Jan. 13, 2016; Date of Mailing of International Search Report: Jan. 20, 2016.

* cited by examiner

METHOD AND A DEVICE FOR AUTOMATICALLY CUTTING MEAT PRODUCTS SUCH AS BEEF TENDERLOIN INTO PORTIONS

CROSS-REFERENCES TO RELATED APPLICATIONS

This application is the U.S. national phase of International Application No. PCT/DK2015/050292 filed on Sep. 23, 2015, which claims the benefit of priority to Danish Patent Application No. 2014 00544 filed on Sep. 23, 2014 and European Patent Application No. 15152099.6 filed on Jan. 22, 2015. The entire disclosures thereof are incorporated herein by reference.

FIELD OF THE INVENTION

The present invention relates to a method and a device for automatically cutting a meat product, in particular a beef tenderloin, having a thumb-like part extending away from a head part of the meat product towards a tail part such that the meat product has a V-like shape.

BACKGROUND OF THE INVENTION

FIG. 1 depicts graphically a beef tenderloin 100, where the upmost part 111 is often referred to as the head of the tenderloin, the bottom most parts 104-106 as the tail of the tenderloin and the part there between (101-103) is often referred to as the center part of the tenderloin. After the tenderloin has been trimmed, e.g. by removing some parts of fat and membrane, etc. the thumb-like part 110 of the tenderloin extends outwardly from the head part 111 and points somewhat towards the tail of the tenderloin.

As shown here, a cutting profile has been created for the tenderloin based on e.g. image data for instructing a cutting device to cut the tenderloin into fixed portion weights of e.g. 200 g. The head part 111 may of course also be divided into several portions of fixed target weight, e.g. also 200 g. A portion cutter is utilized to automatically cut the tenderloin into such fixed portions based on the cutting profile shown here.

The price of the portions of center cuts 101-104 (often called Barrel) is today around $25/lb ($55/kg) whereas the price of the head steaks (often called Metro) is around $12/lb ($26/kg).

When cutting tenderloin with a portion cutter, in many cases the thumb that forms a V-shape 109 will come out de-attached to the major part of the meat portion, and hence the major part of the meat portion is below the desired target weight, e.g. in the example shown here the major part will be 180 g and the thumb part 20 g. The result is that the meat portion in question will be down-graded to a much lower price than otherwise, i.e. instead of $25/lb it will be down-graded to $12/lb and thus the yield of the processing will obviously be decreased.

United States patent application publication number 2005/032471 to Pfarr et al. is background art.

SUMMARY OF THE INVENTION

On the above background it is an object of embodiments of the present invention to provide an improved method that maximizes the yield in food processing, in particular when creating portions from beef tenderloin.

In general, the invention preferably seeks to mitigate, alleviate or eliminate one or more of the above mentioned disadvantages of the prior art singly or in any combination. In particular, it may be seen as an object of embodiments of the present invention to provide an improved method of automatically cutting a meat product that solves the above mentioned problems, or other problems.

To better address one or more of these concerns, in a first aspect of the invention a method is provided of automatically cutting a meat product, in particular beef tenderloin, having a thumb-like part extending away from a head part of the meat product towards a tail part such that the meat product has a V-like shape, comprising:
  conveying the meat product to be cut,
  obtaining image data of the meat product,
  determining a boundary position between the thumb-like part and the head part of the meat product,
  utilizing the image data in instructing a cutting unit to cut the meat product into portions,
  wherein the cutting includes cutting on both sides of the boundary position such that the resulting portion fulfills a pre-defined criteria including a criterion indicating the extent of the thumb-like part in the resulting portion.

Accordingly; by cutting the meat product in that way where at least a part of the thumb-like part is attached and contributes to the portion weight within this area the value of this portion may be greatly increased, where in case the meat product is beef tenderloin the price today may be doubled, i.e. instead of being $12/lb it can be sold for $25/lb., e.g. since it is a single piece fulfilling the portion weight requirement, and since it is a center cut.

The thumb-like part is generally a meat portion that forms an angle of more than 270° from a longitudinal axis of the remaining part of the meat. In one embodiment, the boundary position comprises a position of a tip of the V-like shape (corresponding to the bottom of the V-like shape), or of the above mentioned 270° or more angle.

The thumb-like part may also be referred to as a wing.

The extent of the thumb-like part in the resulting portion may for example be the size or weight of the thumb-like part compared to the total size or weight of the resulting portion.

It is noted that the meat product that is being cut automatically in accordance with various aspects of the invention, normally has been trimmed in advance. Thus, in case the meat product is a beef tenderloin, the image configuration with a main part, including a head, a center and a tail part, where a thumb-like part extends obliquely away from the head part in a general direction towards the tail part, is a result of such a trimming process, e.g. a pre-trimming, where. e.g. fat and membrane parts have been removed including fat and membrane parts between muscle parts, thus revealing a recess or notch giving a V-shape as shown in e.g. FIG. 1. As regards the angle of the V-like shape, e.g. the angle of the thumb-like part from a longitudinal axis of the remaining part of the meat, this may vary. For example, the thumb-like part may extend in a direction from the head part towards the tail part and be only slightly directed outwards, meaning that the thumb-like part is located relatively close to the center part of the tenderloin. The thumb-like part may extend or be bent more outwards, e.g. to provide a broader "V" or possibly even a "U" in the V-like shape, but will in general still extend in a direction from the head part to the tail part of the tenderloin.

The conveying of the meat product, e.g. the beef tenderloin, is preferably such that the longitudinal axis of the meat product is substantially parallel to the conveying direction, and where cutting the meat product into portions is performed substantially perpendicular to the conveying direction of the meat product.

In one embodiment, the criterion indicating the extent of the thumb-like part in the resulting portion comprises a maximum depth of a remaining part of a recess between the thumb-like part and the head part in the resulting portion. In one embodiment, the maximum depth of the remaining part of the recess between the thumb-like part and the head part in the resulting portion is around 50% or less. This means that the thickness of the meat within the area between the thumb-like part and the head part of the meat, which may also be considered as the remaining part of the meat, is at least 50% or more, but this percentage number is well acknowledged within the meat industry, especially in USA, because the appearance of the meat portion will be very similar to the remaining meat portions. Also, the criterion may comprise that the attachment between the head part and the thumb-like part is at least a measure in the range of ⅔ to ¾ of the thickness of the portion, e.g. in accordance with customer specifications, etc.

It is noted that the recess between the thumb-like part and the head part may be referred to as a notch. Other terms may be used as well within the field.

In one embodiment, the pre-defined criteria includes a weight target. Accordingly, the above mentioned meat portions may now fulfill the set target weight of e.g. 200 g.

In one embodiment, the boundary position comprises a position of a tip (which may also be referred to as a bottom) of the V-like shape.

When determining the boundary position between the thumb-like part and the head part of the meat product, various methods and techniques may be used, whether or not the boundary position comprises a position of a tip (corresponding to the bottom) of the V-like shape. It is noted that the boundary position may be an area, e.g. an area comprising a position of a tip of the V-like shape. For example, an area determined by estimating a crossing area for linear parts of the V-like shape or a triangular area at the tip of the V-like shape may be utilized. Other estimating methods for determining an area, which may be a boundary position, can be utilized. Also, the boundary position can be a single point.

In one embodiment, when instructing the cutting unit to cut a meat portion next to said resulting portion that is defined by cuts on both sides of the boundary position, towards the tail part based on said image data, a remaining part of said thumb-like part, which is not attached to said resulting portion, is disregarded. Thus, the method may include that a potential remaining end of the thumb-like part, which will be cut off when performing the cutting of the resulting portion, which comprises the boundary position, is not considered when e.g. performing calculations regarding the position of the cut that defines the next portion in the direction towards the tail part. When for example making portions fulfilling a fixed weight, the remaining, i.e. un-attached, end of the thumb-like part will not be considered, e.g. included in the calculations, only the center part, of the e.g. tenderloin will be considered when making the fixed weight portion and the remaining end of the thumb-like part may be used for other purposes, e.g. as trim.

In one embodiment, image data for the remaining part of said thumb-like part, which is not attached to said resulting portion that is defined by cuts on both sides of the boundary position, is disregarded when instructing the cutting unit to cut said meat portion next to said resulting portion towards the tail part to fulfil the predefined criteria. In this way, it is achieved that the e.g. calculations to provide a fixed weight portion will consider data only relating to the center part of the e.g. tenderloin and that the remaining, i.e. un-attached end of said thumb-like part will be allocated for other purposes, e.g. as trim or the like.

In one embodiment, wherein utilizing the image data in instructing a cutting unit to cut at a cutting position on both sides of the boundary position such that the resulting portion fulfills said pre-defined criteria, the cutting position on one or both sides of the boundary position is adjusted to improve yield while still fulfilling said pre-defined criteria. Hereby, it is achieved that in case the predefined criteria for the resulting portion, i.e. the extent of the thumb-like part in the resulting portion, e.g. the maximum depth of a recess or notch, and possibly a weight target can be fulfilled by a range of cutting positions on one or both sides of the boundary positions, the cutting position(s) for the resulting portion may be adjusted such that e.g. size/weight of the end of the thumb-like part that will be cut off and will be used for e.g. trim or the like, is reduced or minimized. Similar calculations and simulations can be made for e.g. trim and/or the prize of the portions, including portions that are made next to said resulting portion, i.e. the portion having the boundary position, in dependence of positions of the cuts on both sides of the boundary position. Thus, also the trim that may be cut off at one or both ends of the meat product, e.g. a beef tenderloin, may be minimized according to this embodiment.

In a second aspect of the invention a computer program product is provided comprising computer readable instructions for carrying out the above mentioned method steps when the computer program product is executed on a suitable computer system.

In a third aspect of the invention a cutting device is provided for automatically cutting a meat product, in particular beef tenderloin, the meat product having a thumb-like part extending away from a head part of the meat product towards a tail part such that the meat product has a V-like shape, comprising:
   a conveyor for conveying a meat product to be cut,
   an imaging means for obtaining image data of the meat product,
   a processor for utilizing the image data in determining a boundary position between a thumb-like part and a head part of the meat product,
   a cutting unit, and
   a processor for utilizing the image data in instructing the cutting unit to cut the meat product into portions,
wherein the processor for utilizing the image data in instructing the cutting unit to cut the meat product into portions is configured for instructing the cutting unit to cut on both sides of the boundary position such that the resulting portion fulfills a pre-defined criteria including a criterion indicating the extent of the thumb-like part in the resulting portion.

The processors mentioned above may include one and the same processor. Also, the cutting unit may be selected from, but is not limited to, a higher pressure water-jet cutter, any type of cutting blade, e.g. a straight or curved cutting blade, where e.g. the cutting unit may have a cutting plane positioned within between two ends (e.g. out-feed end and in-feed end) of adjacent conveyors.

The image data for the meat product to be cut and/or the determination of the boundary position may be provided using imaging means, which may comprise e.g. a laser-line scanner and a camera for obtaining image data of the meat product while being conveyed, where the image data include image data indicating a boundary position between a thumb-like part and a head (or the remaining) part of the meat product forming a V-shape. Other imaging means and techniques may be used, e.g. imaging means based on X-ray techniques, which may be advantageous in case the V-shape between the thumb-like part and the head (or the remaining) part of the meat product is e.g. not visibly distinct, for example caused by the thumb-like part lying close to the head (or the remaining) part of the meat product and/or caused by material such as fat, membranes, etc. obscuring the tip (or bottom) of the V-like shape.

In a further aspect of the invention a method is provided of automatically cutting a meat product, in particular beef tenderloin, the meat product having a thumb-like part extending away from a head part of the meat product towards a tail part such that the meat product has a V-like shape, comprising:
  conveying the meat product to be cut,
  obtaining image data of the meat product,
  determining a boundary position between the thumb-like part and the head part of the meat product,
  utilizing the image data in instructing a cutting unit meat product into portions,
  wherein the cutting includes cutting on both sides of the boundary position such that the resulting portion fulfills a pre-defined criteria.

In one embodiment, said predefined criteria may include a criterion indicating yield for the automatic cutting of the meat product into portions.

In one embodiment, said predefined criteria may include a criterion indicating size, weight and/or volume of the end of the thumb-like part that is cut off when cutting on both sides of the boundary position.

In one embodiment, said predefined criteria may include a criterion indicating size, weight and/or volume of trim parts of the meat product resulting from the meat product being cut into portions.

In one embodiment, said pre-defined criteria may include a criterion indicating the extent of the thumb-like part in the resulting portion, which comprises the boundary position.

In one embodiment, the criterion indicating the extent of the thumb-like part in the resulting portion comprises a maximum depth of a remaining part of a recess between the thumb-like part and the head part in the resulting portion.

In one embodiment, the maximum depth of the remaining part of the recess between the thumb-like part and the head part in the resulting portion is around 50% or less.

In a still further aspect of the invention a method is provided of method of automatically cutting an elongated meat product into portions,
the portions being substantially transverse to the longitudinal direction of the elongated meat product,
the elongated meat product having a thumb-like part extending away from a side of a main part of the elongated meat product in a direction such that the elongated meat product observed together with the thumb-line part has a V-like shape,
the method comprising:
  conveying the elongated meat product to be cut into portions,
  obtaining image data of the elongated meat product,
  utilizing the image data in instructing a cutting unit to cut the elongated meat product into portions that fulfill certain criteria and
  wherein the cutting includes cutting concerning cutting the thumb-like part.

In one embodiment, the criterion concerning cutting the thumb-like part includes a criterion concerning the weight or volume of the part of the thumb-like part that after cutting is not attached to the main part of the elongated meat product.

In one embodiment, the step of utilizing the image data in instructing the cutting unit to cut the elongated meat product into portions that fulfill certain criteria includes a criterion to one or both end pieces of the main part of the elongated meat product.

In one embodiment, the criterion concerning cutting the thumb-like part includes a criterion to the part of the thumb-like part that after cutting is attached to a portion of the main part of the elongated meat product, the criterion being one or more of
  the weight
  the volume
  the length In a still further aspect of the invention, the boundary position can be determined by the following method:
  Preferable but not necessary the head of the meat product is leading in the conveying direction
  A laser line is illuminating the product from above, preferably vertically and across the product
  A camera is situated compared to the laser at an angle of for instance 20°
  The camera will observe the laser line as a curved line where the deviation from a straight line is proportional with the height of the item
  For instance the scanline is analyzed at intervals of for instance one millimeter per product travel
  Each scanline is searched for zero height between two higher points
  The first detection of such appearance is where the boundary position is—alternatively, if the conveying direction is opposite, the last detection.

A similar method can be applied using X-ray technology, where the X-ray sensor may be positioned below the conveyor belt and the X-ray source is positioned above the conveyor belt, where the X-ray beam passes through the product and the conveyor belt and can be detected by the X-ray sensor. The resulting signal may be processed, where e.g. the attenuation of the signal may be a measure of the thickness of the product. The boundary position may be found in the same way as described above.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 2:
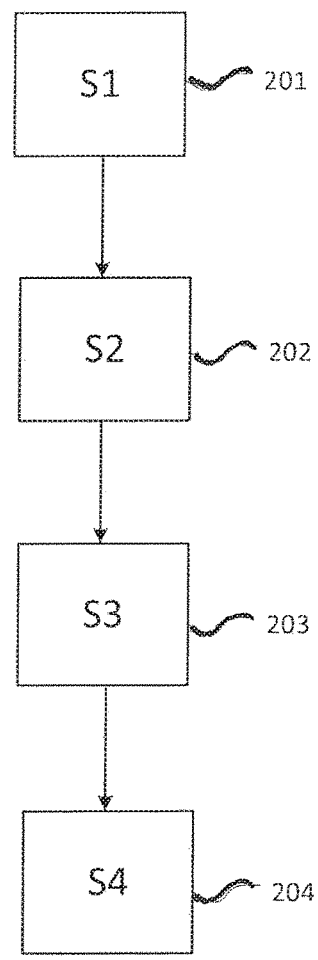
FIG. 2 depicts a flowchart of a method according to the present invention.

FIG. 2 shows a flowchart of a method according to the present invention of automatically cutting meat product, in particular beef tenderloin, having a thumb-like part extending away from a head part of the meat product towards a tail part such that the meat product has a V-like shape. In case the meat product is a beef tenderloin, the image configuration with a main part, including a head, a center and a tail part, where a thumb-like part extends Obliquely away from the head part in a general direction towards the tail part, is a result of a trimming process, where e.g. fat and membrane parts have been removed including fat and membrane parts between muscle parts, thus revealing a recess giving a V-shape as shown in the figures.

In step (S1) 201, a meat product to be cut is conveyed by any type of a conveyor means, e.g. a conveyor comprising a conveyor belt.

In step (S2) 202, image data of the meat product is obtained, typically while the meat product is conveyed, In step (S3) 203, a boundary position between a thumb-like part and a head or the remaining part of the meat product is determined. The image data may originate from a line-laser scanner, digital imaging or any other type of imaging techniques well known to a person skilled in the art. As an example, in case line-laser scanner is used and imaging device may be utilized to capture the light reflected from the meat product. Other imaging means and techniques may be used, e.g. imaging means based on X-ray techniques.

In step (S4) 204, the image data is utilized in instructing a cutting unit to cut the meat product into portions of typically fixed weights. This may also be formulated such that the image data is utilized to define a cutting profile based on pre-defined targets based on e.g. customer's orders of e.g. specific portion weights. The cutting includes cutting on both sides of the boundary position between the thumb-like part and the head or the remaining part of the meat product such that the resulting portion fulfills a pre-defined criteria, e.g. weight target, including a criteria indicating the extent of the V-shape in the resulting portion.

In one embodiment, the criteria indicating the extent of the V-shape is around, but is not limited to, 50% or less, i.e. so that the meat thickness within this area is 50% or more.

Figure 3:
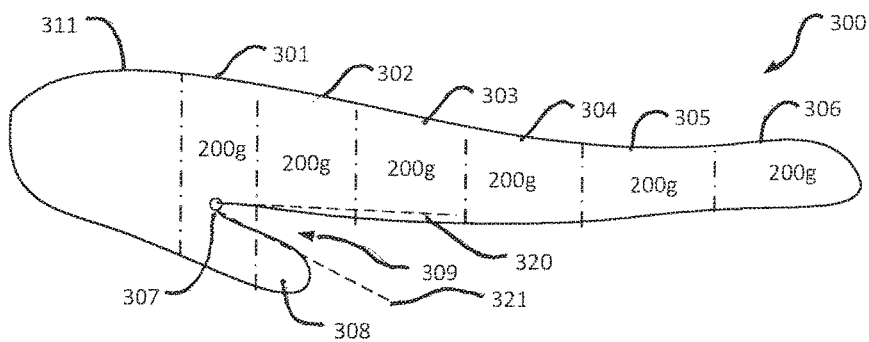
FIG. 3 depicts graphically a cutting profile for a beef tenderloin according to the present invention.

FIG. 3 depicts graphically an example of a cutting profile created for beef tenderloin 300 based on the method according to the present invention for cutting the tenderloin into e.g. fixed weight targets 301-306 of e.g. 200 g.

Figure 1:
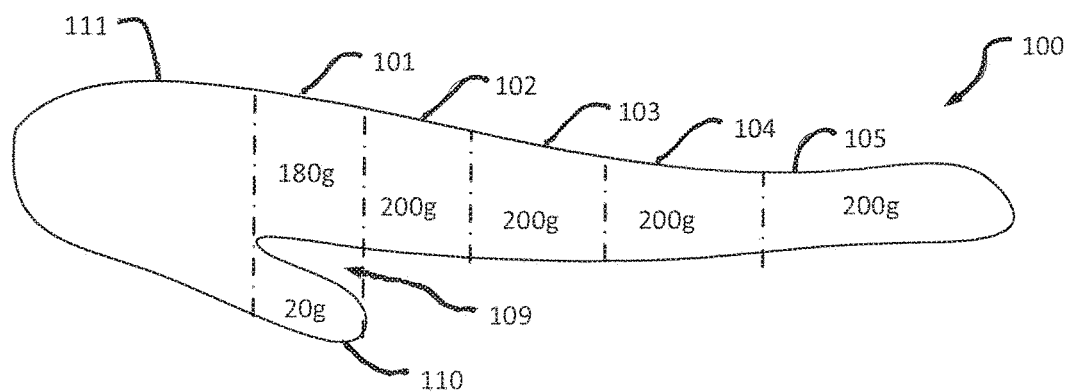
FIG. 1 depicts graphically a prior art cutting profile for a beef tenderloin.

What distinguishes the present invention from prior art methods (see FIG. 1) is that the value of portion 301 is enhanced by including at least a part of the thumb-like part 308 in the portion 301, but up to an extent such that the V-shape 309 is visible in the resulting portion up to certain extent, e.g. 50% or less.

As shown here, the beef tenderloin may be divided into a head part 311, tail part (approx. the area 305-306) and the center part which is between the head part 311 and the tail part. The thumb-like part 308 of the tenderloin 300 extends outwardly from the head part 311 (or the remaining part) and points somewhat towards the tail of the tenderloin so that it form an angle of 270° or more compared to an longitudinal axis 320 of the tenderloin, as indicated by a dotted line 320 and the dotted line 321.

The boundary position between a thumb-like part and a head or remaining part of the meat product forming a V-shape 309 may in one embodiment comprise the position of a tip (or bottom) 307 of the V-shaped portion meaning that the cutting profile is opposite to this tip 307, and is selected such that the V-shape in the resulting portion will preferably not exceed 50% of the thickness of the resulting portion. In this case, the cutting is performed on both sides of the tip 307 such that the V-shape in the portion is 50% or less and that the portion 301 fulfils a pre-defined target, e.g. target weight.

Figure 4:
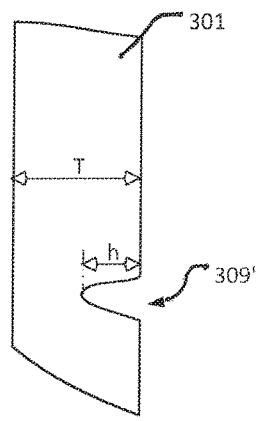
FIG. 4 depicts a meat portion resulting from the cutting profile shown in FIG. 3.

FIG. 4 shows the resulting portion 301 after being cut, where the remaining part of the recess 309' between the thumb-like part and the head part h into the portion 301 does not exceed 50% of the total thickness T of the portion, but this ratio is in many countries, e.g. USA, acceptable and has the same value as the center portions 302, 303.

Figure 5:
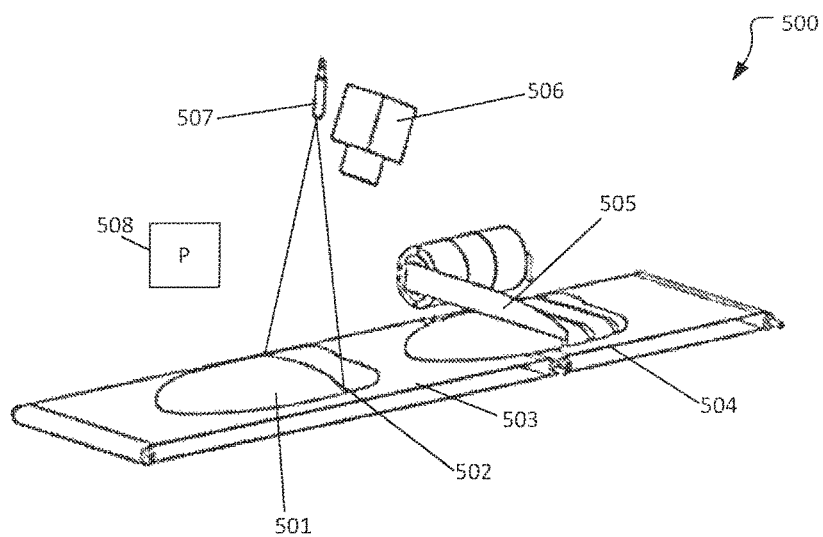
FIG. 5 shows a cutting device according to the present invention.

FIG. 5 shows an example of a cutting device 500 according to the present invention for automatically cutting a meat product 501, in particular beef tenderloin, having a thumb-like part (not shown) extending away from a head part of the meat product towards a tail part such that the meat product has a V-shape. The device comprises a conveyor 503 for conveying a meat product to be cut, an imaging means which may comprise a laser-line scanner 507 and a camera 506 for obtaining image data of the meat product while being conveyed, where the image data include image data indicating a boundary position between a thumb-like part and a head (or the remaining) part of the meat product forming a V-shape. Other imaging means and techniques may be used, e.g. imaging means based on X-ray techniques.

The device further comprises a cutting unit 505, which as shown here has a cutting plane between two adjacent conveyors 503, 504, and a processor 508 for utilizing the image data in instructing the cutting unit to cut the meat product into portions.

The cutting includes cutting on both sides of the boundary position between the thumb-like part and the head or the remaining part of the meat product such that the resulting portion fulfills a pre-defined criteria including a criteria indicating the extent of the V-shape in the resulting portion.

Figure 6:
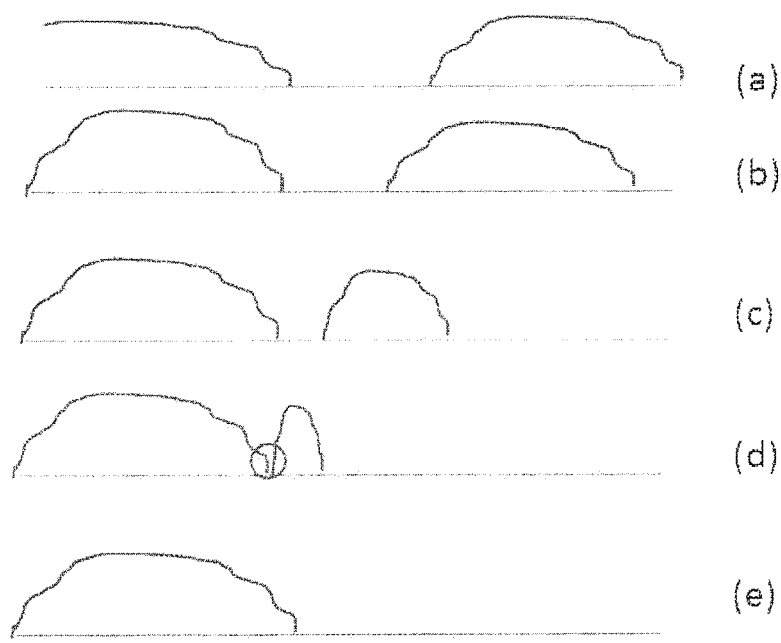
FIG. 6 shows an example of a detection of a boundary between a thumb like portion of a beef tenderloin and the remaining part of the beef tenderloin.

FIG. 6 shows an exemplary embodiment of how the image from e.g. line scanner data may be analyzed, showing several cross sections of the food item from (a)-(e), where the right part may be the thumb like part and the left part be the head or remaining part of the beef tenderloin. The horizontal line there between indicates the space between the beef tenderloin and the thumb like part. As shown, the space there between successively decreases until there is no or very small space there between. The circle may indicate the tip of the boundary between the thumb like part and the head or remaining part.

A similar method can be applied using X-ray technology, where the X-ray sensor may be positioned below the conveyor belt and the X-ray source is positioned above the conveyor belt, where the X-ray beam passes through the product and the conveyor belt and can be detected by the X-ray sensor. The resulting signal may be processed, where e.g. the attenuation of the signal may be a measure of the thickness of the product. The boundary position may be found in the same way as described above.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A method of automatically cutting a meat product, using a cutting unit, said meat product having a thumb-like part extending away from a head part of the meat product towards a tail part such that the meat product has a V-like shape, comprising:
   conveying the meat product to be cut,
   obtaining image data of the meat product by an imaging device,
   determining, by a processor, a boundary position between the thumb-like part and the head part of the meat product,
   utilizing, by the processor, the image data to determine and output instructions to the cutting unit to cut the meat product into portions, and
   cutting the meat product, by the cutting unit, into the portions based on the output instructions,
   where the cutting includes cutting on both sides of the boundary position such that the resulting portion fulfills a pre-defined criteria including a criterion indicating the extent of the thumb-like part in the resulting portion.

2. The method according to claim 1, wherein the criterion indicating the extent of the thumb-like part in the resulting portion comprises a maximum depth of a remaining part of a recess between the thumb-like part and the head part in the resulting portion.

3. The method according to claim 2, wherein the maximum depth of the remaining part of the recess between the thumb-like part and the head part in the resulting portion is around 50% or less.

4. The method according to claim 1, wherein the pre-defined criteria includes a weight target.

5. The method according to claim 1, wherein the boundary position comprises a position of a tip of the V-like shape.

6. The method according to claim 1, wherein, when instructing the cutting unit to cut a meat portion next to said resulting portion that is defined by cuts on both sides of the boundary position, towards the tail part based on said image data, a remaining part of said thumb-like part, which is not attached to said resulting portion, is disregarded.

7. The method according to claim 6, wherein image data for the remaining part of said thumb-like part, which is not attached to said resulting portion that is defined by cuts on both sides of the boundary position, is disregarded when instructing the cutting unit to cut said meat portion next to said resulting portion towards the tail part to fulfil the predefined criteria.

8. The method according to claim 1, wherein utilizing the image data in instructing a cutting unit to cut at a cutting position on both sides of the boundary position such that the resulting portion fulfills said pre-defined criteria, the cutting position on one or both sides of the boundary position is adjusted to improve yield while still fulfilling said pre-defined criteria.

9. One or more non-transitory computer-readable mediums having stored thereon executable instructions that, when executed by the one or more processors, configure an automatic cutting system to perform the following steps to automatically cut a meat product, using a cutting unit, said meat product having a thumb-like part extending away from a head part of the meat product towards a tail part such that the meat product has a V-like shape:
   convey the meat product to be cut,
   obtain image data of the meat product by an imaging device,
   determine a boundary position between the thumb-like part and the head part of the meat product by utilizing a processor,
   utilize, by the processor, the image data to determine and output instructions to the cutting unit to cut the meat product into portions, and
   cut the meat product, by the cutting unit, into the portions based on the output instructions,
   where the step of cutting includes cutting on both sides of the boundary position such that the resulting portion fulfills a pre-defined criteria including a criterion indicating the extent of the thumb-like part in the resulting portion.

* * * * *